(12) United States Patent
Okubo et al.

(10) Patent No.: US 11,045,865 B2
(45) Date of Patent: Jun. 29, 2021

(54) METHOD FOR PRODUCING FORGED CRANKSHAFT

(71) Applicant: NIPPON STEEL CORPORATION, Tokyo (JP)

(72) Inventors: Junichi Okubo, Tokyo (JP); Kenji Tamura, Tokyo (JP); Kunihiro Yoshida, Tokyo (JP); Sam Soo Hwang, Tokyo (JP); Ryusuke Nakano, Tokyo (JP); Masao Hori, Tokyo (JP); Yukihiro Ota, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/640,220

(22) PCT Filed: Jul. 30, 2018

(86) PCT No.: PCT/JP2018/028370
§ 371 (c)(1),
(2) Date: Feb. 19, 2020

(87) PCT Pub. No.: WO2019/039193
PCT Pub. Date: Feb. 28, 2019

(65) Prior Publication Data
US 2020/0360984 A1    Nov. 19, 2020

(30) Foreign Application Priority Data
Aug. 21, 2017   (JP) .............................. JP2017-158536

(51) Int. Cl.
*B21K 1/08*        (2006.01)
(52) U.S. Cl.
CPC ..................................... *B21K 1/08* (2013.01)

(58) Field of Classification Search
CPC ..... B21J 1/06; B21J 13/025; B21J 5/08; B21J 5/008; B21J 9/027; B21J 9/022;
(Continued)

(56) References Cited

U.S. PATENT DOCUMENTS 2,911,705 A * 11/1959 Vom Bovert ............ B21K 1/08
29/6.01
2,959,840 A * 11/1960 Albers ..................... B21K 1/08
29/6.01
(Continued)

FOREIGN PATENT DOCUMENTS

| JP | 59045051 A | 3/1984 |
| JP | 62244545 A | 10/1987 |

(Continued)

OTHER PUBLICATIONS

ISR issued in Int'l. patent application No. PCT/JP2018/028370, dated Oct. 23, 2018.

*Primary Examiner* — Jun S Yoo
(74) *Attorney, Agent, or Firm* — Greer Burns & Crain Ltd.

(57) ABSTRACT

Provided is a production method, including a first preforming process, a second preforming process, and a finish forging process. In the first preforming process, while a plurality of flat parts are formed, a region to be a second pin is decentered. The second preforming process includes: a process of pressing each region to be a plurality of journals in a pressing direction corresponding to a width direction of the flat part by using a pair of second dies; and a process of, after starting the pressing by the second dies, decentering a region to be a first pin and to be disposed in a first position and a region to be a third pin and to be disposed in a third position from each other in opposite directions with a width direction of the flat part being as a decentering direction by using third dies.

2 Claims, 15 Drawing Sheets

(58) Field of Classification Search
CPC ....... B21J 1/04; B21J 5/02; B21J 5/025; B21J 5/027; F16C 3/08; B21K 1/08
See application file for complete search history.

(56) References Cited

U.S. PATENT DOCUMENTS

| | | | | |
|---|---|---|---|---|
| 3,129,488 A * | 4/1964 | Robra | ................. | B21K 1/08 |
| | | | | 29/888.08 |
| 2017/0173664 A1 * | 6/2017 | Okubo | ................. | B21J 1/04 |
| 2018/0071813 A1 | 3/2018 | Okubo et al. | | |

FOREIGN PATENT DOCUMENTS

| | | | | | |
|---|---|---|---|---|---|
| JP | 02255240 | A | 10/1990 | | |
| JP | 2001105087 | A | 4/2001 | | |
| JP | 2016107273 | A | 6/2016 | | |
| WO | WO-2015129208 | A1 * | 9/2015 | ................ | B21J 1/04 |
| WO | 2016147674 | A1 | 9/2016 | | |
| WO | 2016152933 | A1 | 9/2016 | | |

* cited by examiner

IB-IB

VIIA-VIIA

VIIB-VIIB

XIIA-XIIA

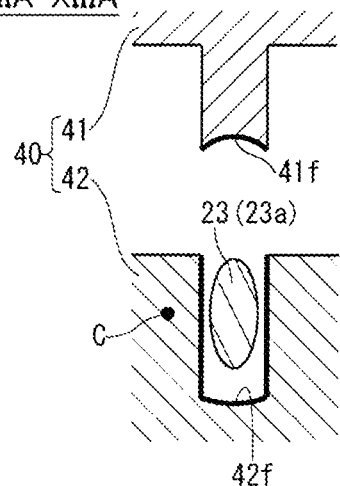
FIG. 13A
XIIIA-XIIIA
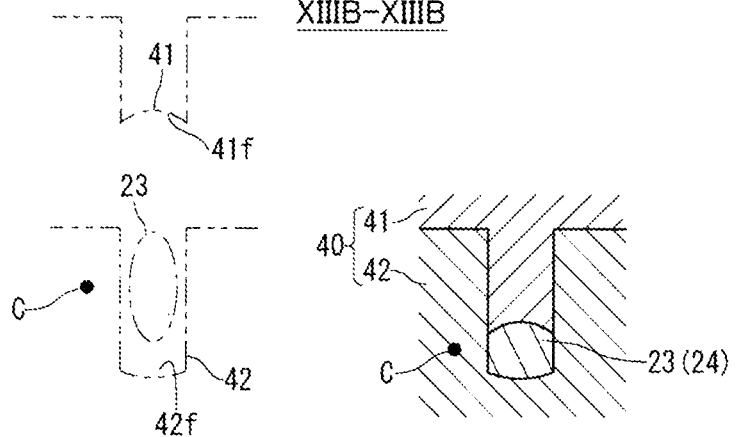
FIG. 13B    XIIIB-XIIIB

METHOD FOR PRODUCING FORGED CRANKSHAFT This is a National Phase Application filed under 35 U.S.C. § 371, of International Application No. PCT/JP2018/028370, filed Jul. 30, 2018, the contents of which are incorporated by reference.

TECHNICAL FIELD

The present invention relates to a method for producing a crankshaft by hot forging.

BACKGROUND ART

A crankshaft is essential in a reciprocating engine for an automobile, a motorcycle, an agricultural machine, a ship, or the like to transform reciprocating movement of a piston into rotational movement for deriving power. A crankshaft can be produced either by die forging or casting. When high strength and high rigidity are required for a crankshaft, a crankshaft produced by die forging (hereinafter referred to as a "forged crankshaft") is often used.

FIGS. 1A to 1C are schematic diagrams to illustrate an exemplary shape of a typical forged crankshaft. Among these figures, FIG. 1A is a general view, FIG. 1B is an IB-IB sectional view of FIG. 1A, and FIG. 1C is a diagram to show phases of pins. The example shown in FIG. 1B representatively shows one crank arm A1, a counterweight W1 that is integral with the crank arm A1, and a pin P1 and a journal J1, which are connected to the crank arm A1.

A forged crankshaft 11 shown in FIGS. 1A to 1C is a forged crankshaft of 3-cylinder 4-counterweight to be mounted on a 3-cylinder engine. The forged crankshaft 11 includes four journals J1 to J4, three pins P1 to P3, a front part Fr, a flange part Fl, and six crank arms (hereinafter also referred to as "arms") A1 to A6. The arms A1 to A6 connect the journals J1 to J4 with the pins P1 to P3, respectively. Moreover, some arms of the six arms A1 to A6 integrally include counterweights (hereinafter also referred to as "weights") W1 to W4. To be specific, the first arm A1, second arm A2, fifth arm A5, and sixth arm A6 integrally include weights W1, W2, W3, and W4, respectively. The third arm A3 and fourth arm A4 do not include any weight and thus have an elongated circular shape.

The front part Fr is provided at a front end in the axial direction of the forged crankshaft 11, and the flange part Fl is provided at a rear end thereof. The front part Fr is connected to the front most first journal J1, and the flange part Fl is connected to the rear most fourth journal J4.

Hereinafter, when collectively referring to the journals J1 to J4, the pins P1 to P3, the arms A1 to A6, and the weights W1 to W4, respectively, their symbols are also denoted as "J" in the journals, "P" in the pins, "A" in the arms, and "W" in the weights. Moreover, the arm A and the weight W that is integral with the arm A are collectively referred to as a "web".

As shown in FIG. 1C, three pins P1 to P3 are disposed to be deviated from each other by 120° centering on the journal J. That is, the first, second, and third pins P1, P2, and P3 are respectively disposed at a first position L1, second position L2, and third position L3. Mutual phase angles of the first position L1, the second position L2, and the third position L3 are 120°.

As shown in FIG. 1B, a width Bw of the weight W is more than a width Ba of the arm A. Therefore, the weight W largely projects from an arm center plane (plane including center axes of the pin P and the journal).

When producing a forged crankshaft having such shape, in general, a billet is used as the starting material. A section perpendicular to the longitudinal direction of the billet, that is, a cross section thereof has circular or rectangular shape. The area of the cross section is constant over the entire length of the billet. The term "cross section" as used herein means a section perpendicular to the longitudinal direction of the billet or each preform to be described below, or the axial direction of the forged crankshaft. The term "longitudinal section" means a section in parallel with the longitudinal direction thereof or the axial direction thereof. Also, the area of a cross section is simply referred to as a "cross sectional area". The forged crankshaft is produced by performing a preforming process, a die forging process, and a flash-trimming process in that order. Moreover, as required, a coining process is performed after the flash-trimming process. Typically, the preforming process includes a roll forming process and a bend forging process. The die forging process includes a rough forging process and a finish forging process.

FIGS. 2A to 2F are schematic diagrams to illustrate a conventional production process of a typical forged crankshaft. Among these figures, FIG. 2A shows a billet; FIG. 2B a rolled preform; FIG. 2C a bent preform; FIG. 2D a rough forged preform; FIG. 2E a finish forged preform; and FIG. 2F a forged crankshaft. It is noted that FIGS. 2A to 2F show a series of processes when producing the forged crankshaft 11 shown in FIGS. 1A to 1C.

Referring to FIGS. 2A to 2F, the production method of the forged crankshaft 11 will be described. First, a billet 12 having a predetermined length as shown in FIG. 2A is heated in a heating furnace and thereafter subjected to roll forming and bend forging in that order in the preforming process. In the roll forming process, the billet 12 is rolled by use of, for example, a grooved roll, thereby reducing the cross sectional area. As a result, the volume of the billet 12 is distributed in the axial direction to obtain a rolled preform 13 that is an intermediate starting material (see FIG. 2B). Next, in the bend forging, the rolled preform 13 is partly pressed from a direction perpendicular to the axial direction. As a result, the volume of the rolled preform 13 is distributed to obtain a bent preform 14 that is a further intermediate starting material (see FIG. 2C).

Successively, in the rough forging process, the bent preform 14 is subjected to forging by use of a vertical pair of dies to obtain a rough forged preform 15 (see FIG. 2D). The resulting rough forged preform 15 has an approximate shape of the forged crankshaft (final product) formed thereon. Further, in the finish forging process, the rough forged preform 15 is subjected to forging by use of a vertical pair of dies, to obtain a finish forged preform 16 (see FIG. 2E). The resulting finish forged preform 16 has been formed into a shape corresponding to that of the forged crankshaft as the final product. During the rough forging and finish forging, excess material flows out from between die parting surfaces of mutually opposed dies, forming flash B. As a result, each of the rough forged preform 15 and the finish forged preform 16 has pronounced flash B around its circumference.

In the flash-trimming process, for example, the finish forged preform 16 having flash is held by being sandwiched between a pair of dies, and in that state, the flash B is punched off by use of a tool die. As a result, the flash B is removed from the finish forged preform 16, and thereby a flash-free forged preform is obtained. The flash-free forged preform has an approximately same shape as that of the forged crankshaft 11 as shown in FIG. 2F.

In the coining process, principal parts of the flash-free forged preform are pressed slightly from upward and downward with dies so that the flash-free forged preform is reformed to have the same size and shape as those of the final product. Here, the principal parts of the flash-free forged preform include, for example, shaft portions such as the journals J, the pins P, the front part Fr, and the flange part Fl, and further the arms A and the weights W. Thus, the forged crankshaft 11 is produced. It is noted that when producing a forged crankshaft of 3-cylinder 4-counterweight, a twisting process may be added after the flash-trimming process to adjust the layout angle (a phase angle of 120°) of the pin.

The production process shown in FIGS. 2A to 2F can be applied to a forged crankshaft of 3-cylinder 6-counterweight without being limited to the forged crankshaft of 3-cylinder 4-counterweight as shown in FIGS. 1A to 1C.

The principal purpose of the preforming process is to distribute the volume of the billet. By distributing the volume of the billet in the preforming process, it is possible to reduce the formation of flash in the following die forging process, thereby improving material yield. Here, the term "material yield" means a fraction (percentage) of the volume of the forged crankshaft (final product) to that of the billet.

Moreover, a preform obtained by preforming is formed into a forged crankshaft in the following die forging process. To obtain a forged crankshaft with a precise shape, it is necessary to form a preform with a precise shape in the preforming process.

Techniques concerning production of a forged crankshaft are disclosed in Japanese Patent Application Publication No. 2001-105087 (Patent Literature 1), Japanese Patent Application Publication No. 02-255240 (Patent Literature 2), Japanese Patent Application Publication No. 62-244545 (Patent Literature 3), and Japanese Patent Application Publication No. 59-45051 (Patent Literature 4). Patent Literature 1 discloses a preforming method using a pair of upper and lower dies. In the preforming method, when a bar-like workpiece is pressed by the upper and lower dies, a part of the workpiece is elongated, and concurrently another part in continuous with that part is offset with respect to the axis. Patent Literature 1 states that since elongation and bending can be performed at the same time, it is possible to decrease the facility cost.

The preforming method of Patent Literature 2 uses a 4-pass high speed rolling facility instead of conventional 2-pass roll forming. In that preforming method, the cross sectional area of a rolled preform is determined according to the distribution of cross sectional areas of a weight, an arm, and a journal of a forged crankshaft (final product). Patent Literature 2 states that this allows improvement of material yield.

In the preforming method of Patent Literature 3, the volume of a part of a billet is distributed in an axial direction and a radial direction of the billet by cross rolling. By die forging the billet in which volume is distributed, a forged crankshaft is obtained. Patent Literature 3 states that as a result, material yield can be improved.

In the production method of Patent Literature 4, a billet is formed into a forged crankshaft by a single die forging step by use of a pair of upper and lower dies and a punch. In the die forging process, first, a region to be a journal and a region to be a pin of the billet are pressed by use of punches which operate independently. As a result of pressing, the volume of the billet is distributed. Thereafter, die forging is performed by means of the upper die and the lower die. That is, preforming and die forging can be performed in a single step. Patent Literature 4 states that as a result, the forged crankshaft with a complex shape can be efficiently produced by a single facility.

CITATION LIST

Patent Literature

Patent Literature 1: Japanese Patent Application Publication No. 2001-105087
Patent Literature 2: Japanese Patent Application Publication No. 02-255240
Patent Literature 3: Japanese Patent Application Publication No. 62-244545
Patent Literature 4: Japanese Patent Application Publication No. 59-45051

SUMMARY OF INVENTION

Technical Problem

In the production of a forged crankshaft, as described above, it is required to reduce formation of flash, thereby improving material yield. Moreover, it is desired that a preform with a precise shape is formed in the preforming process. In the preforming method according to Patent Literature 1, it is possible to perform, to some extent, distribution of the volume of the billet and decentering of a region to be a pin (hereinafter, also referred to as a "pin-corresponding part").

However, the decentering of the pin-corresponding part and the distribution of volume are insufficient, so that flash is largely formed as the formation of the pin proceeds in the following die forging. Further, according to the preforming method of Patent Literature 1, the distribution of volume between a region to be a weight, and a region to be an arm, which integrally includes the weight, is not studied, in a region to be a web. For that reason, in the following die forging process, fillability of material becomes insufficient in the weight that largely projects from the center plane of the arm, and under-filling is likely to occur. To prevent under-filling of the weight, it is convenient to increase excess volume in the preform. However, in such a case, material yield will decline. Hereinafter, a region to be a weight is referred to as a "weight-corresponding part". A region to be an arm, which integrally includes a weight but the weight is excluded, is referred to as an "arm-corresponding part". The weight-corresponding part and the arm-corresponding part are also collectively referred to as a "web-corresponding part".

In the preforming method of Patent Literature 2, decentering of a pin-corresponding part is not possible. This is because the method relies on roll forming. Therefore, flash is largely formed when a pin is formed by the following die forging. Moreover, in the preforming method of Patent Literature 2, it is not possible to perform volume distribution between a weight-corresponding part and an arm-corresponding part in a web-corresponding part. This is also because the method relies on roll forming. Therefore, fillability of the material of the weight becomes insufficient in the following die forging process. As a result, under-filling is likely to occur.

In the preforming method of Patent Literature 3, a facility for performing cross rolling is required. Therefore, the facility cost increases, and improvement of manufacturing efficiency is difficult.

In the production method of Patent Literature 4, since preforming and die forging are performed by a single facility, it is not possible to perform preforming in which a billet is significantly deformed. For that reason, with the production method of Patent Literature 4, it is difficult to improve material yield.

It is an objective of the present invention to provide a method for producing a forged crankshaft, which enables formation of a forged crankshaft with a precise shape, and improvement of material yield.

Solution to Problem

The method for producing a forged crankshaft according to the present embodiment is a method for producing a forged crankshaft, the forged crankshaft including: four journals each defining a rotation center; three pins each decentered with respect to the journals, the pins being respectively disposed at a first position, a second position, and a third position at a phase angle of 120°; and a plurality of crank arms that connect the journals with the pins, respectively.

The method for producing a forged crankshaft of the present embodiment includes a first preforming process for obtaining a first preform from a billet, a second preforming process for obtaining a final preform from the first preform, and a finish forging process for forming the final preform into a finishing dimension of the forged crankshaft by at least a single die forging step.

In the first preforming process, by using a pair of first dies, a region to be the pin and a region to be the journal of the billet are pressed from a direction perpendicular to an axial direction of the billet, so that while a cross sectional area of each of the regions is decreased thereby forming a plurality of flat parts, a region to be a second pin and to be disposed at the second position of the flat parts is decentered such that the decentering amount of the region to be the second pin becomes equal to or less than the decentering amount of the finishing dimension.

The second preforming process includes: a process of pressing regions to be the plurality of journals in a pressing direction corresponding to a width direction of the flat part, by using a pair of second dies; and a process of, after starting pressing by the second dies, decentering a region to be disposed at the first position and to be a first pin, and a region to be disposed at the third position and to be a third pin from each other in opposite directions in a decentering direction corresponding to the width direction of the flat part by using third dies, such that decentering amounts of the regions to be the first pin and the third pin are equal to, or less than $(\sqrt{3})/2$ of the decentering amount of the finishing dimension.

In the final preform, a thickness of each region to be the plurality of crank arms is equal to a thickness of the finishing dimension.

Advantageous Effects of Invention

The method for producing a forged crankshaft according to an embodiment of the present invention makes it possible to obtain a final preform, in which distribution of volume in an axial direction is enhanced, by a first preforming process and a second preforming process. Moreover, in the final preform, the volumes of a region to be a journal, a region to be a pin, and a region to be an arm are appropriately distributed. It is possible to form the shape of the forged crankshaft from the final preform by the finish forging process. This allows improvement of material yield. Moreover, according to the present invention, a preform with a precise shape can be formed by the first preforming process and the second preforming process. For that reason, a forged crankshaft with a precise shape can be produced.

BRIEF DESCRIPTION OF DRAWINGS

FIG. 8B is a cross sectional view to show the region to be the pin and to be disposed at the second position when pressing is ended in the exemplary processing flow of the first preforming process.

FIG. 13A is a cross-sectional view to show a region to be a pin and to be disposed at a second position when the pressing process is started in the exemplary processing flow of the second preforming process.

FIG. 13B is a cross-sectional view to show the region to be the pin and to be disposed at the second position when the pressing process is ended in the exemplary processing flow of the second preforming process.

DESCRIPTION OF EMBODIMENTS

Figure 1A:
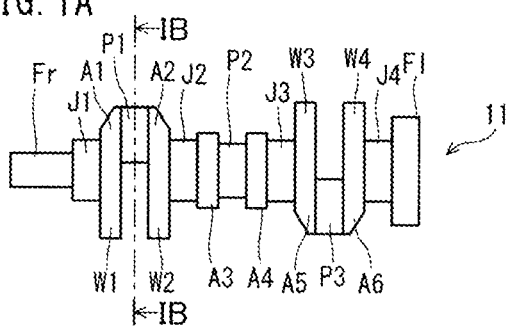
FIG. 1A is a general view to schematically show an exemplary shape of a typical forged crankshaft.

The production method of a forged crankshaft of the present embodiment is a production method of a forged crankshaft including: four journals each defining a rotation center; three pins each decentered with respect to the journals, the pins being respectively disposed at a first position, a second position, and a third position at a phase angle of 120°; a plurality of crank arms that connect the journals with the pins, respectively.

The production method of a forged crankshaft of the present embodiment includes a first preforming process for obtaining a first preform from a billet; a second preforming process for obtaining a final preform from the first preform; and a finish forging process for forming the final preform into a finishing dimension of the forged crankshaft by at least a single die forging step.

In the first preforming process, by using a pair of first dies, a region to be the pin and a region to be the journal of the billet are pressed from a direction perpendicular to an axial direction of the billet, so that while a cross sectional area of each of the regions is decreased thereby forming a plurality of flat parts, a region to be a second pin and to be disposed at the second position of the flat parts is decentered such that the decentering amount of the region to be the second pin becomes equal to or less than the decentering amount of the finishing dimension.

The second preforming process includes: a process of pressing regions to be the plurality of journals in a pressing direction corresponding to a width direction of the flat part, by using a pair of second dies; and a process of, after starting pressing by the second dies, decentering a region to be disposed at the first position and to be a first pin, and a region to be disposed at the third position and to be a third pin from each other in opposite directions in a decentering direction corresponding to the width direction of the flat part by using third dies, such that decentering amounts of the regions to be the first pin and the third pin are equal to, or less than $(\sqrt{3})/2$ of the decentering amount of the finishing dimension.

In the final preform, a thickness of each region to be the plurality of crank arms is equal to a thickness of the finishing dimension.

According to the production method of the present embodiment, it is possible to obtain the final preform in which distribution of volume in the axial direction is facilitated by the first preforming process and the second preforming process. Moreover, since, the volumes of the region to be the journal, the region to be the pin, and the region to be the arm are appropriately distributed, the final preform has a shape close to the shape of the forged crankshaft. Thus, by the finish forging process, it is possible to form the shape of the forged crankshaft from the final preform. These allow to improve material yield.

Moreover, in the second preforming process, the third dies, which are operated independent of the second dies that press the regions to be the journals, decenter the region to be the first pin and the region to be the third pin. If the second die is integral with the third die, a portion that decenters the region to be the first pin and the region to be the third pin projects further than a portion that presses the region to be the journal. For that reason, if the first preform is disposed in the second die which is integral with the third die, the first preform is likely to be inclined. However, if the third die is separately operated from the second die, it is possible to arrange such that the third die that decenters the region to be the first pin and the region to be the third pin will not project further than the portion that presses the region to be the journal. For that reason, even if the first preform is disposed in the second dies, the first preform is not likely to be inclined. Since the first preform in which volume is distributed is pressed at a predetermined position in the second dies, under-filling or the like is not likely to occur in the final preform after pressing. Note that the expression, an arm "integrally" includes a weight, means that the arm and the weight are not separate parts, but both are formed from the same billet.

Preferably, in the second preforming process, after pressing by a pair of second dies is completed, decentering of the region to be the first pin and the region to be the third pin by the third dies is started.

Hereinafter, the method for producing a forged crankshaft according to the present embodiment will be described with reference to the drawings.

1. Exemplary Production Process

Figure 1B:
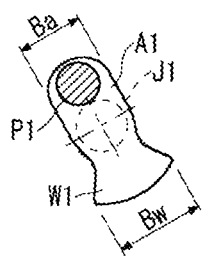
FIG. 1B is an IB-IB sectional view of FIG. 1A.
Figure 1C:
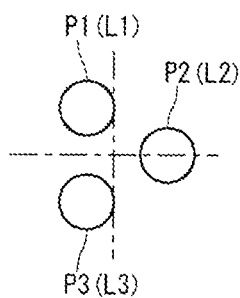
FIG. 1C is a diagram to show phases of pins with respect to the forged crankshaft of FIG. 1A.
Figure 2A:
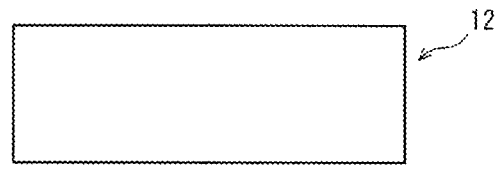
FIG. 2A is a schematic diagram to show a billet in a conventional production process.
Figure 2B:
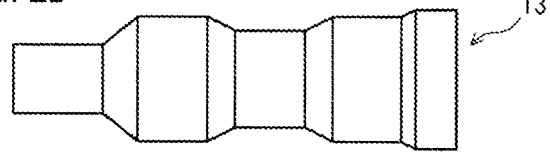
FIG. 2B is a schematic diagram to show a rolled preform in the conventional production process.
Figure 2C:
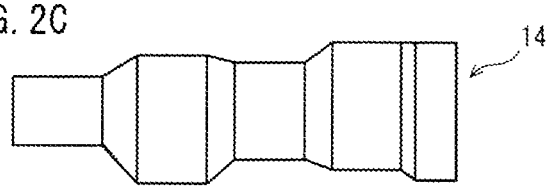
FIG. 2C is a schematic diagram to show a bent preform in the conventional production process.
Figure 2D:
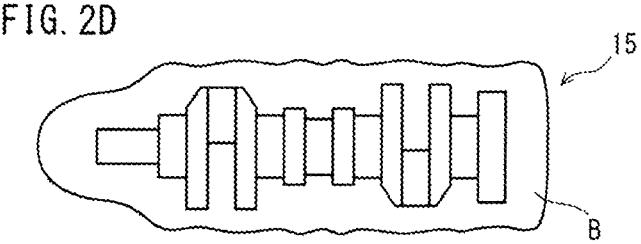
FIG. 2D is a schematic diagram to show a rough forged preform in the conventional production process.
Figure 2E:
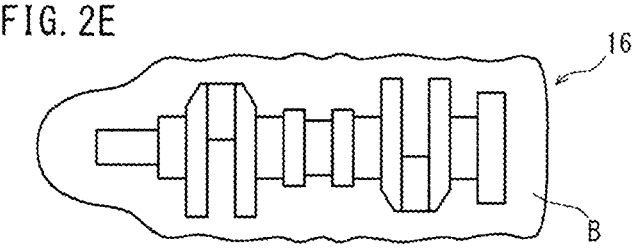
FIG. 2E is a schematic diagram to show a finish forged preform in the conventional production process.
Figure 2F:
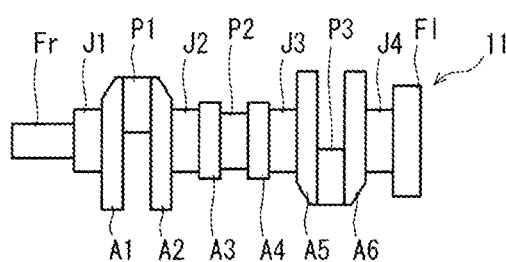
FIG. 2F is a schematic diagram to show a forged crankshaft in the conventional production process.

A forged crankshaft to be addressed by the production method of the present embodiment includes four journals J that define a rotational center, three pins P that are decentered with respect to the journals J, and a plurality of arms A that each connect the journals J with the pins P, respectively. The three pins P1, P2, and P3 are respectively disposed at a first position L1, second position L2, and third position L3. Hereinafter, the pin to be disposed at the first position L1 is also referred to as a first pin P1. The pinto be disposed at the second position L2 is also referred to as a second pin P2. The pin to be disposed at the third position L3 is also referred to as a third pin P3. Mutual phase angles of the first position L1, the second position L2, and the third position L3 are 120°. For example, the forged crankshaft of 3-cylinder 4-counterweight shown in FIGS. 1A to 1C is the target of production.

The production method according to the present embodiment includes a first preforming process, a second preforming process, and a finish forging process. A flash-trimming process may be added as a post process of the finish forging process. Moreover, as required, a coining process may be added after the flash-trimming process. The adjustment of the layout angle of the pins can be performed in the finish forging process. Alternatively, a twisting process may be added after the flash trimming process, and adjustment of the layout angle of the pins may be performed by the twisting process. A series of these processes are performed as a hot processing.

Figure 3A:
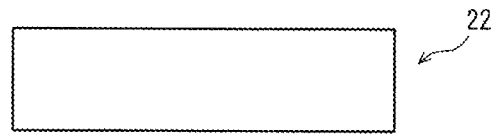
FIG. 3A is a schematic diagram to show a billet in an exemplary production process of the present embodiment.
Figure 3B:
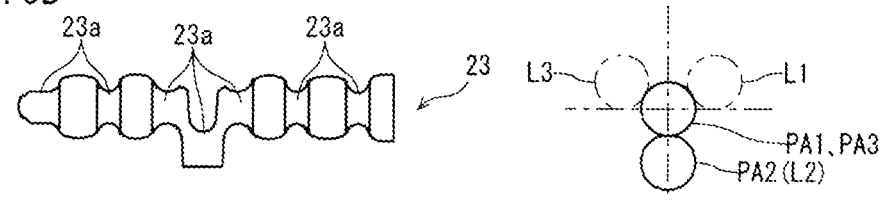
FIG. 3B is a schematic diagram to show a first preform in the exemplary production process of the present embodiment.
Figure 3C:
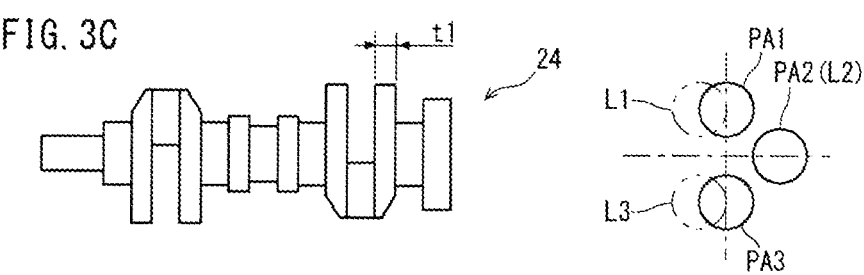
FIG. 3C is a schematic diagram to show a final preform in the exemplary production process of the present embodiment.
Figure 3D:
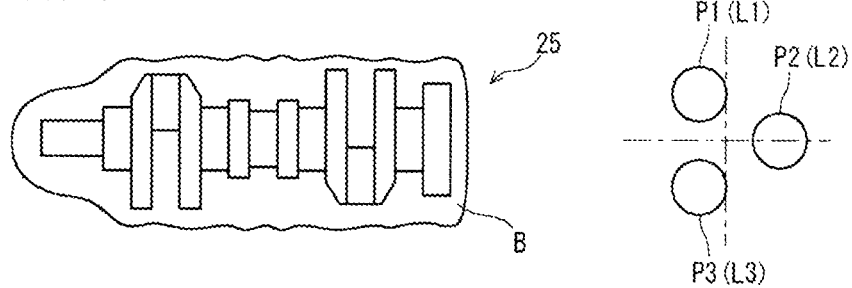
FIG. 3D is a schematic diagram to show finish forged preform in the exemplary production process of the present embodiment.
Figure 3E:
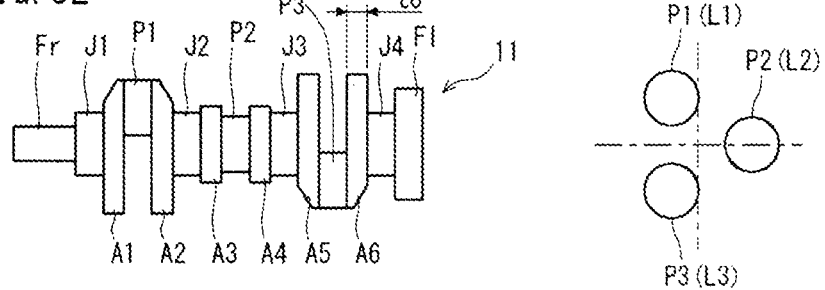
FIG. 3E is a schematic diagram to show a forged crankshaft in the exemplary production process of the present embodiment.

FIGS. 3A to 3E are schematic diagrams to illustrate an exemplary producing process of the forged crankshaft according to the present embodiment. Among these figures, FIG. 3A shows a billet; FIG. 3B a first preform; FIG. 3C a final preform; FIG. 3D a finished forged preform; and FIG. 3E a forged crankshaft. It is noted that FIGS. 3A to 3E show a series of processes when producing the forged crankshaft 11 having the shape as shown in FIGS. 1A to 1C. The figures on the left hand sides of FIGS. 3B and 3C are front views. Each figure on the right hand side of FIGS. 3B and 3C shows positions of regions to be the first, second, and third pins (hereinafter, also referred to as a "first pin-corresponding part", "second pin-corresponding part", and "third pin-corresponding part") PA1, PA2, and PA3 with respect to the center of a region to be the journal (hereinafter, also referred to as a "journal-corresponding part"). The figures on the left hand sides of FIGS. 3D and 3E are plan views. The figures on the right hand side of FIGS. 3D and 3E show the positions of the first, second, and third pins P1, P2, and P3 with respect to the center of the journal. Moreover, in each figure on the right hand side of FIGS. 3B and 3C, the first position L1 to the third position L3 of the pin of the forged crankshaft as a final product are shown by imaginary lines.

In the first preforming process, a billet 22 is pressed by using the first dies. The pressing direction in that situation is a direction perpendicular to the axial direction of the billet 22. In this case, the three pin-corresponding parts and the four journal-corresponding parts of the billet 22 are crushed, thereby reducing the cross sectional areas of those regions. Accordingly, a plurality of flat parts 23a are formed in the billet 22. The flat parts 23a are formed at positions of the pin-corresponding parts and the journal-corresponding parts.

Moreover, in the first preforming process, among the flat parts 23a, the second pin-corresponding part PA2 is decentered along the pressing direction. As a result of the pin-corresponding parts and the journal-corresponding parts being reduced, a first preform 23 in which volume is distributed is obtained. Where, the decentering amount of the second pin-corresponding part of the first preform 23 is equal to or less than that of the finishing dimension. The decentering amount of the finishing dimension means the decentering amount of the pin of the forged crankshaft. The first preforming process can be performed according to, for example, an exemplary processing flow to be described below.

The second preforming process includes a pressing process and a decentering process.

In the pressing process, regions to be a plurality of journals of the first preform 23 are pressed by using a pair of second dies. The pressing direction at that time is a width direction of the flat part. That is, the pressing direction is a direction perpendicular to the decentering direction of the second pin-corresponding part PA2. To be more specific, in the second preforming process, the first preform 23 obtained in the first preforming process is rotated by 90°, thereafter being pressed.

In the decentering process, after pressing by the second dies is started, a region (first pin-corresponding part) to be the first pin and to be disposed at the first position and a region (third pin-corresponding part) to be the third pin and to be disposed at the third position are decentered from each other in opposite directions by using third dies. The decentering direction at that time is the width direction of the flat part. The decentering amounts of regions to be the first and third pins are each made to be equal to or less than $(\sqrt{3})/2$ of the decentering amount of finishing dimension. As a result of this, it is possible to obtain a final preform 24 in which an approximate shape of the forged crankshaft has been formed.

In the final preform 24, the decentering directions of the first pin-corresponding part PA1 and the third pin-corresponding part PA3 are opposite to each other. That is, in the final preform 24, the phase angle between the first pin-corresponding part PA1 and the second pin-corresponding part PA2 is 90°. The phase angle between the third pin-corresponding part PA3 and the second pin-corresponding part PA2 is 90°. Also, the phase angle between the first pin-corresponding part PA1 and the third pin-corresponding part PA3 is 180°. Moreover, in the final preform 24, a thickness $t_1$ (see FIG. 3C) in an axial direction of an arm-corresponding part is equal to a thickness $t_0$ of finishing dimension (see FIG. 3E). The thickness $t_0$ of finishing dimension means a thickness in the axial direction of the arm of the forged crankshaft (final product). The second preforming process will be described below in detail.

In the finish forging process, the final preform 24 is formed into the finishing dimension of the forged crankshaft by die forging. In specific, a pair of upper and lower dies is used. The final preform 24 is disposed on the lower die in a posture in which the first and third pin-corresponding parts PA1 and PA3 are aligned with each other in a horizontal plane. Then forging is performed by moving the upper die downward. That is, the pressing direction of forging is the decentering direction of the second pin-corresponding part PA2. As a result, as excess material flows out, flash B is formed and a finish forged preform 25 with flash is obtained (see FIG. 3D). In the finish forged preform 25, a shape in accordance with the forged crankshaft as the final product is formed. Since an approximate shape of the forged crankshaft is formed in the final preform 24, it is possible to limit the formation of flash B to a minimum in the finish forging process. The finish forging process may be performed in one step, or in several separate steps.

In the flash-trimming process, for example, with the finish forged preform 25 with flash being sandwiched between a pair of dies, the flash B is punched off by use of a tool die. Thus, the flash B is removed from the finish forged preform 25. As a result, the forged crankshaft 11 (final product) is obtained.

2. Exemplary Processing Flow of First Preforming Process

Figure 4A:
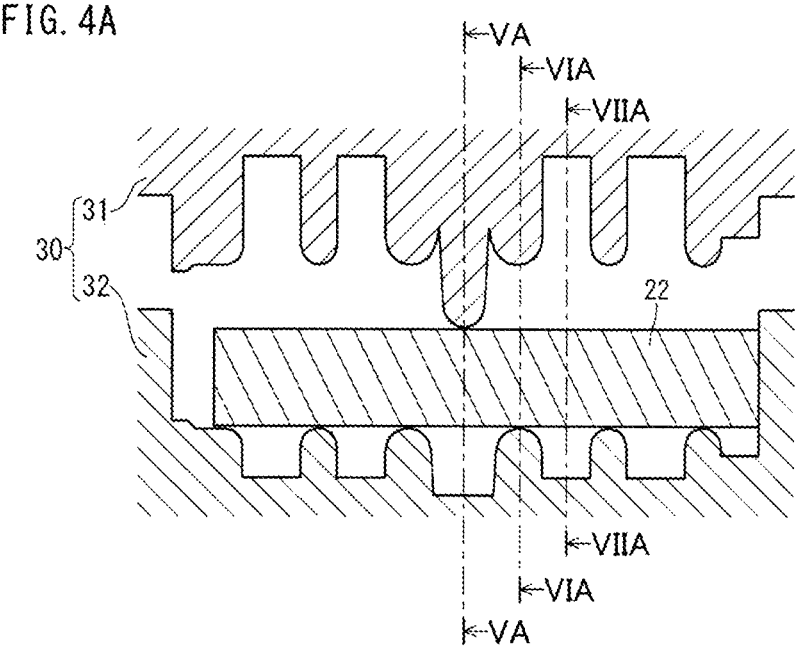
FIG. 4A is a longitudinal sectional view to schematically show a state when pressing is started in an exemplary processing flow of a first preforming process.
Figure 4B:
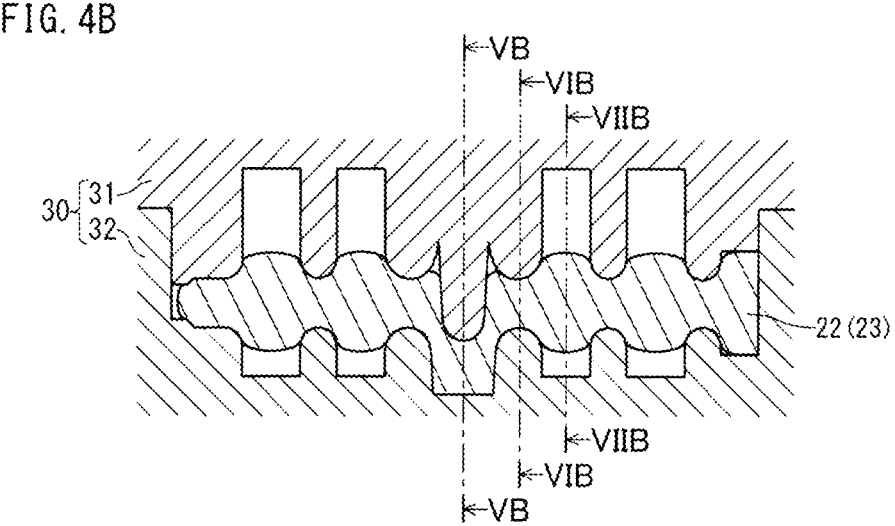
FIG. 4B is a longitudinal sectional view to schematically show a state when pressing is ended in the exemplary processing flow of the first preforming process.

FIGS. 4A to 7B are schematic diagrams to show an exemplary processing flow of the first preforming process. Among these figures, FIG. 4A is a longitudinal sectional view to show a state when pressing is started, and FIG. 4B is a longitudinal sectional view to show a state when pressing is ended.

Figure 5A:
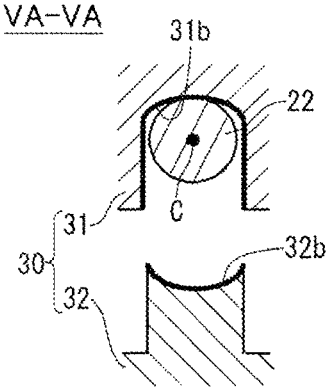
FIG. 5A is a cross sectional view to show a region to be a pin and to be disposed at a second position when pressing is started in the exemplary processing flow of the first preforming process.
Figure 5B:
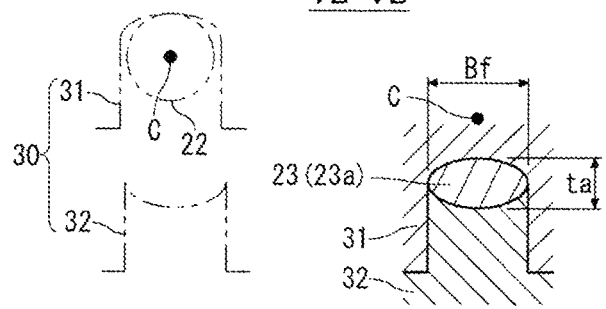

FIGS. 5A and 5B are cross sectional views to show the region to be the pin and to be disposed at the second position (second pin-corresponding part). Among these figures, FIG. 5A shows a state when pressing is started, and FIG. 5B shows a state when pressing is ended. Further, FIG. 5A is a VA-VA sectional view of FIG. 4A, and FIG. 5B is a VB-VB sectional view of FIG. 4B.

Figure 6A:
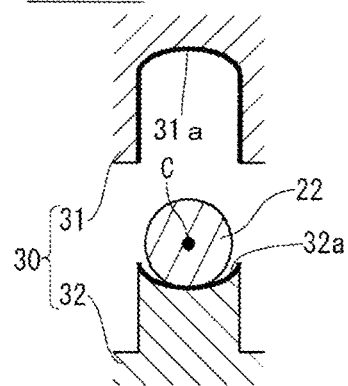
FIG. 6A is a cross sectional view to show a region to be a journal when pressing is started in the exemplary processing flow of the first preforming process.
Figure 6B:
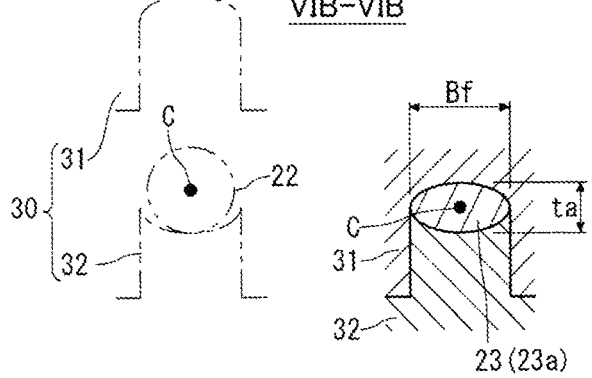
FIG. 6B is a cross sectional view to show the region to be the journal when pressing is ended in the exemplary processing flow of the first preforming process.

FIGS. 6A and 6B are cross sectional views to show the journal-corresponding part. Among these figures, FIG. 6A shows a state when pressing is started, and FIG. 6B shows a state when pressing is ended. Further, FIG. 6A is a VIA-VIA sectional view of FIG. 4A, and FIG. 6B is a VIB-VIB sectional view of FIG. 4B.

Figure 7A:
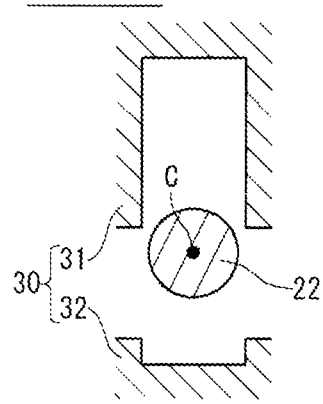
FIG. 7A is a cross sectional view to show an arm-corresponding part when pressing is started in the exemplary processing flow of the first preforming process.
Figure 7B:
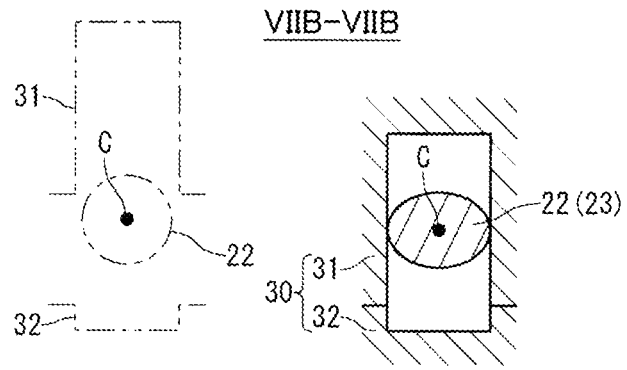
FIG. 7B is a cross sectional view to show the arm-corresponding part when pressing is ended in the exemplary processing flow of the first preforming process.

FIGS. 7A and 7B are cross sectional views to show the arm-corresponding part. Among these figures, FIG. 7A shows a state when pressing is started, and FIG. 7B shows a state when pressing is ended. Further, FIG. 7A is a VIIA-VIIA sectional view of FIG. 4A, and FIG. 7B is a VIIB-VIIB sectional view of FIG. 4B.

FIGS. 4A to 7B show the billet 22 (or the first preform 23) having a circular cross section, and first dies 30 consisting of a pair of upper and lower dies. The first dies 30 include a first upper die 31 and a first lower die 32. For easy understanding of the state, an axial position C of the journal-corresponding part is indicated by a black circle in FIGS. 5A to 7B. In FIGS. 5B, 6B, and 7B, the first upper die 31, the first lower die 32, and the billet 22 when pressing is started are indicated together by two-dot chain lines. The pair of first dies 30 includes a pin-processing part that is to abut against the pin-corresponding part, and a journal-processing part that is to abut against the journal-corresponding part.

The pin-processing part consists of, as indicated by thick lines in FIG. 5A, an upper-die pin-processing part 31b provided in the first upper die 31, and a lower-die pin-processing part 32b provided in the first lower die 32. The upper-die pin-processing part 31b has a concave shape and can accommodate the billet 22. The lower-die pin-processing part 32b is provided in a front end surface of a convex part. It is noted that there is no limitation on which of the upper-die pin-processing part 31b and the lower-die pin-processing part 32b is formed into a concave shape. That is, the lower-die pin-processing part 32b may have a concave shape that can accommodate the billet.

The pin-processing parts that are to abut against the first and third pin-corresponding parts are similar to the pin-processing part that is to abut against the second pin-corresponding part as shown in FIGS. 5A and 5B. However, in the pressing direction, the positions of the pin-processing parts that are to abut against the first and third pin-corresponding parts are different from the position of the pin-processing part that is to abut against the second pin-corresponding part (see FIGS. 4A and 4B).

The journal-processing part consists of as shown by thick lines in FIG. 6A, an upper-die journal-processing part 31a provided in the first upper die 31, and a lower-die journal-processing part 32a provided in the first lower die 32. The upper-die journal-processing part 31a has a concave shape, and can accommodate the billet 22. The lower-die journal-processing part 32a is provided in a front end surface of a convex part. It is noted that there is no limitation on which of the upper-die journal-processing part 31a and the lower-die journal-processing part 32a is formed into a concave shape. That is, the lower-die journal-processing part 32a may have a concave shape that can accommodate the billet.

In the first preforming process, the first upper die 31 is moved upward, and with the first upper die 31 and the first lower die 32 being separated, the billet 22 is disposed between the first upper die 31 and the first lower die 32. When the first upper die 31 is moved downward from this state, the pin-corresponding part of the billet 22 is accommodated in the concave upper-die pin-processing part 31b as shown in FIG. 5A. Moreover, as shown in FIG. 6A, the journal-corresponding part is accommodated in the concave upper-die journal-processing part 31a. When the first upper die 31 is further moved downward, the billet 22 is pressed by the upper-die pin-processing part 31b and the lower-die pin-processing part 32b, and by the upper-die journal-processing part 31a and the lower-die journal-processing part 32a. Therefore, the cross sectional areas of the pin-corresponding part and the journal-corresponding part will be reduced. As a result, the flat part 23a as shown in FIGS. 5B and 6B is formed.

Moreover, in the pin-processing part and the journal-processing part, the position of the pin-processing part that is to abut against the second pin-corresponding part is, as shown in FIG. 4A, different from the position of the pin-processing part that is to abut against the first and third pin-corresponding parts. For this reason, the second pin-corresponding part is decentered along the pressing direction while being deformed. Then, the decentering amount of the second pin-corresponding part is equal to or less than the decentering amount of the finishing dimension. After pressing by the first dies 30 is ended, the first upper die 31 is moved upward, and the processed billet 22 (first preform 23) is taken out.

Adopting such exemplary processing flow, as the pin-corresponding part and the journal-corresponding part are pressed thereby decreasing the cross sectional areas of the pin-corresponding part and the journal-corresponding part, the material of the pin-corresponding part and the journal-corresponding part moves in the axial direction of the billet 22. Because of this, the material flows into the arm-corresponding part between the pin-corresponding part and the journal-corresponding part. As a result, it is possible to obtain the first preform 23 whose volume is distributed in the axial direction.

Moreover, in the course of moving the first upper die 31 downward, the opening of the concave upper-die pin-processing part 31b is blocked by the lower-die pin-processing part 32b so that a closed section is formed by the upper-die pin-processing part 31b and the lower-die pin-processing part 32b (see FIGS. 5A and 5B). Further, the opening of the concave upper-die journal-processing part 31a is blocked by the lower-die journal-processing part 32a so that a closed section is formed by the upper-die journal-processing part 31a and the lower-die journal-processing part 32a (see FIGS. 6A and 6B). As a result, no flash is formed between the first upper die 31 and the first lower die 32. Therefore, it is possible to improve material yield and enhance axial distribution of volume.

In the first preforming process, as described below, formation of flash may be prevented by partially pressing the journal-corresponding part with the journal-processing part. Moreover, formation of flash may also be prevented by partially pressing the pin-corresponding part with the pin-processing part.

In the first preforming process, it is not necessary to press the arm-corresponding part with the first dies in view of enhancing distribution of volume in the axial direction.

In a cross section of the flat part 23a, it is satisfactory that a width Bf in a direction perpendicular to the pressing direction is larger than a thickness ta in the pressing direction. For example, the cross sectional shape of the flat part 23a has an elliptical shape or an elongated circular shape (see FIGS. 5B and 6B). The dimensions of the width Bf and the thickness ta of the flat part 23a may differ in the journal-corresponding part and the pin-corresponding part.

3. Second Dies and Third Dies to be Used in Second Preforming Process

In the second preforming process of the present embodiment, pressing of the journal-corresponding parts and decentering of the first and third pin-corresponding parts are performed. The pressing of the journal-corresponding parts and the decentering of the first and third pin-corresponding parts are performed by separate dies.

When the pressing of the journal-corresponding part and the decentering of the first and third pin-corresponding parts are performed by a single die, the following problems may occur.

Figure 8:
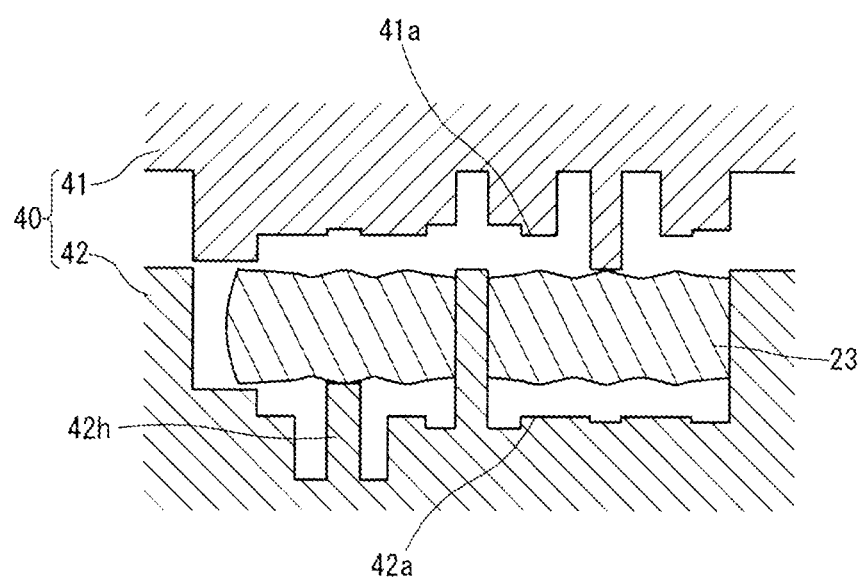
FIG. 8 is a longitudinal sectional view to show a case where a second preforming process is performed by a single die.

FIG. 8 is a longitudinal sectional view to show a case where the second preforming process is performed by a single die. Referring to FIG. 8, the first preform 23 is disposed on a second lower die 42 with a second upper die 41 and the second lower die 42 being separated. As described above, in the second preforming process, the first pin-corresponding part and the third pin-corresponding part are decentered. A pin-processing part 42h of the second lower die 42 that processes the first pin-corresponding part of the first preform 23 projects further than a lower die journal-processing part 42a. Therefore, if the first preform 23 is disposed in the second lower die 42, the first preform 23 is likely to be inclined. If in this state, second dies 40 press the first preform 23, the first preform 23 is likely to move in the axial direction since the first preform 23 is inclined. If the first preform 23 moves during pressing, the position of the first preform 23, which is to be pressed by the second dies 40, will be deviated from a predetermined position. That is, a situation in which the pin-processing part of the second dies 40 presses the arm-corresponding part of the first preform 23 may occur. For that reason, under-filling or the like may occur in the final preform after pressing. To prevent this, two dies are used in the second preforming process of the present embodiment.

Figure 9:
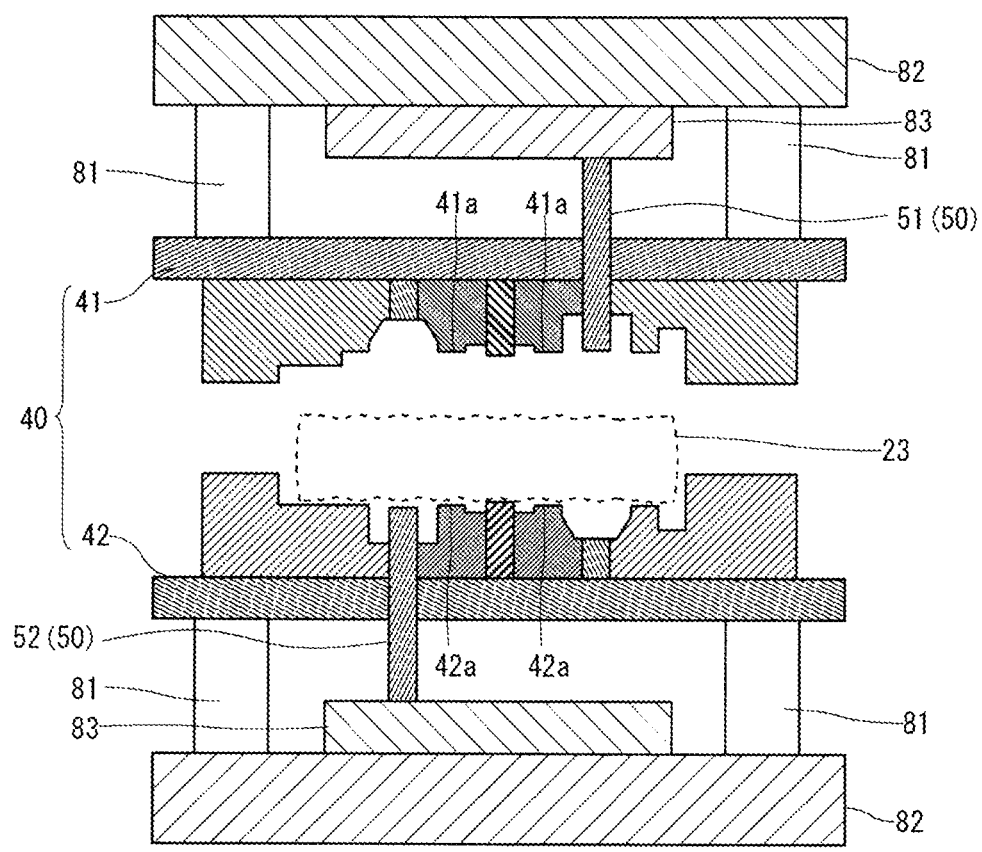
FIG. 9 is a longitudinal sectional view to show second dies and third dies of the present embodiment.

FIG. 9 is a longitudinal sectional view to show the second dies and the third dies of the present embodiment. Referring to FIG. 9, the production apparatus of the present embodiment includes the second dies 40 and third dies 50. The third dies 50 include a third upper die 51 and a third lower die 52. The third upper die 51 decenters the third pin-corresponding part. The third lower die 52 decenters the first pin-corresponding part. The third upper die SI and the third lower die 52 can move upward and downward independent of the second dies 40. Before pressing the first preform 23, the third lower die 52 is disposed at the same height of or below, the lower-die journal-processing part 42a. Moreover, the third upper die 51 is disposed at the same height of, or above, an upper-die journal-processing part 41a. That is, the third upper die 51 and the third lower die 52 do not project further than the upper-die journal-processing part 41a and the lower-die journal-processing part 42a. Therefore, even if the first preform 23 is disposed on the second lower die 42 before starting pressing, the first preform 23 is kept approximately horizontal.

Moreover, decentering of the first preform 23 by the third dies 50 is started after pressing of the first preform 23 by the journal-processing parts 41a, 42a of the second dies 40 is started. Therefore, the journal-corresponding parts of the first preform 23 are pressed by the journal-processing parts 41a, 42a while the third and first pin-corresponding parts are decentered. That is, the journal-corresponding parts of the first preform 23 are restricted by the journal-processing parts 41a, 42a. Therefore, the first preform 23 is not likely to be inclined while the pin-corresponding parts are decentered and is pressed at a predetermined position.

Briefly, as a result of that the third upper die 51 and the third lower die 52 move up and down independently, and that the journal-corresponding parts of the first preform 23 are pressed prior to the third and first pin-corresponding parts, the first preform 23 is not likely to move in the axial direction while the third and first pin-corresponding parts are decentered. Since the first preform 23 in which volume is distributed is pressed at a predetermined position of the second dies 40, under-filling or the like is not likely to occur in the final preform after pressing.

The configurations of the second dies 40 and third dies 50 will be described. The third dies 50 include a control mechanism to move the third upper die 51 and the third lower die 52 up and down independently. The control mechanism is, for example, a die cushion and a hydraulic cylinder.

Referring to FIG. 9, a case in which the control mechanism is a die cushion 81 will be described. The second lower die 42 is supported by a bolster base 82 via the die cushion 81. The die cushion 81 has a cushioning function. The third upper die 51 and the third lower die 52 are supported by the bolster base 82 via a pin base 83. When the second dies 40 start pressing the first preform 23, the third lower die 52 starts projecting from the second lower die 42 and the third upper die 51 starts projecting from the second upper die 41, due to cushioning function of the die cushion 81. The die cushion 81 is set such that after the journal-processing parts 41a, 42a abut against the journal-corresponding parts of the first preform 23, the third lower die 52 and the third upper die 51 come into abutment against the first pin-corresponding part and third pin-corresponding part of the first preform 23, respectively. As a result, the first pin-corresponding part and the third pin-corresponding part of the first preform 23 are decentered after pressing of the journal-corresponding part is started.

Figure 10:
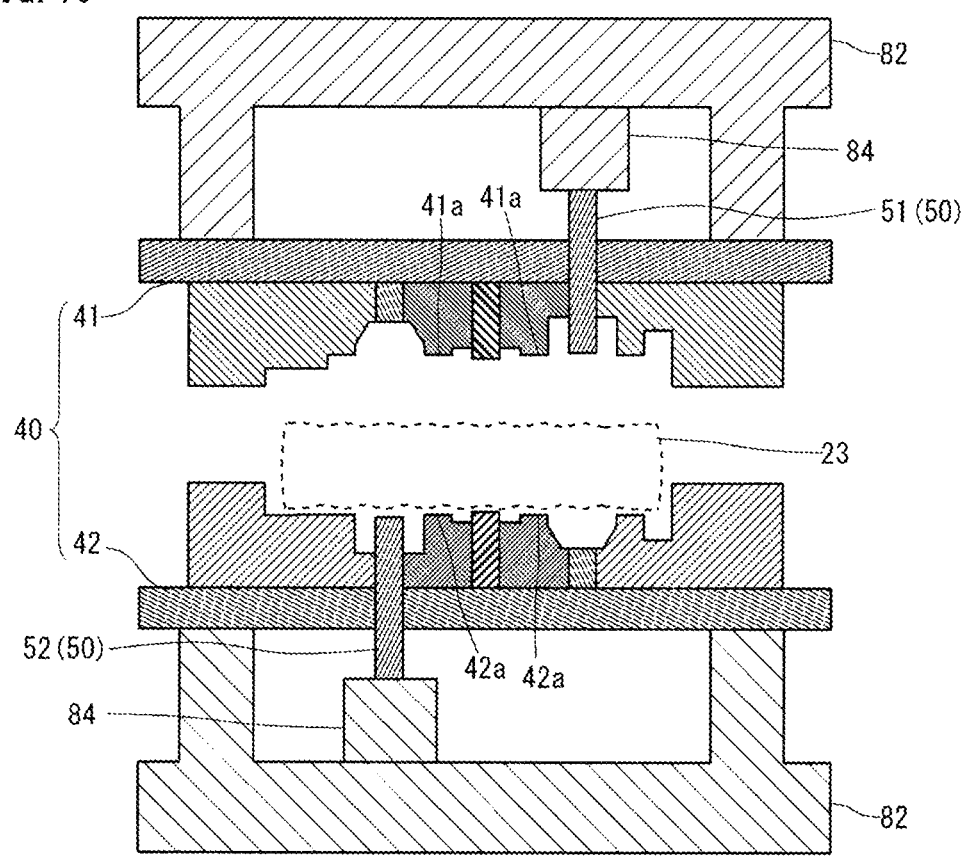
FIG. 10 is a longitudinal sectional view to show the second dies and the third dies of the present embodiment, which are different from FIG. 9.

FIG. 10 is a longitudinal sectional view to show the second dies and the third dies of the present embodiment, which are different from those of FIG. 9. Referring to FIG. 10, description will be made on a case in which the control mechanism is a hydraulic cylinder 84. The hydraulic cylinder 84 can cause the third upper die 51 and the third lower die 52 to move up and down. The third upper die 51 and the third lower die 52 are supported by the bolster base 82 via the hydraulic cylinder 84. When the second dies 40 starts pressing the first preform 23, the hydraulic cylinder 84 operates so that the third lower die 52 starts projecting from the second lower die 42, and the third upper die 51 starts projecting from the second upper die 41. The hydraulic cylinder 84 is set such that after the journal-processing parts 41a, 42a abut against the journal-corresponding parts of the first preform 23, the third lower die 52 and the third upper die 51 come into abutment against the first and third pin-corresponding parts of the first preform 23, respectively. As a result, the first pin-corresponding part and the third pin-corresponding part of the first preform 23 are decentered after pressing of the journal-corresponding part is started.

In either case where the control mechanism is a die cushion or a hydraulic cylinder, the timing at which the third lower die 52 projects from the second lower die 42, and the timing at which the third upper die 51 projects from the second upper die 41 are appropriately set. That is, the first and third pin-corresponding parts of the first preform 23 may be decentered in a period from start to completion of pressing of the journal-corresponding parts. The first and third pin-corresponding parts may be decentered after completion of pressing of the journal-corresponding parts.

Performing decentering of the first and third pin-corresponding parts not in the first preforming process but in the second preforming process has the following advantages. In the first preforming process, the cross sectional areas of the first and third pin-corresponding parts of the billet decrease. That is, the cross sectional areas of the first and third pin-corresponding parts of the first preform 23 are smaller than the cross sectional areas of the first and third pin-corresponding parts of the billet. For that reason, decentering the first and third pin-corresponding parts of the first preform 23 will result in smaller cross sectional areas of the first and third pin-corresponding parts after decentering, thus leaving less excess material, than decentering the first and third pin-corresponding parts of the billet. A smaller amount of excessive material will result in smaller amount of flash after finish forging process that follows, thus improving material yield. Therefore, in the production method of the present embodiment, decentering of the first and third pin-corresponding parts is performed in the second preforming process to improve material yield.

4. Exemplary Processing Flow of Second Preforming Process

FIGS. 11A to 15B are schematic diagrams to show an exemplary processing flow of the second preforming process. Among these figures, FIG. 1A is a longitudinal sectional view to show a state when pressing process is started; FIG. 11B is a longitudinal sectional view to show a state when pressing process is ended; and FIG. 11C is a longitudinal sectional view to show a state when decentering process is ended.

Figure 11A:
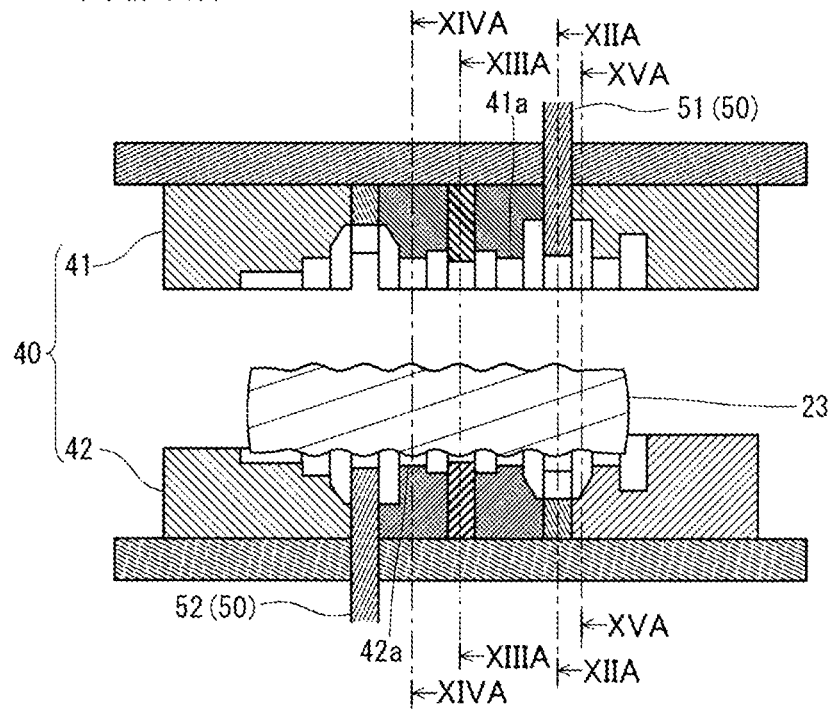
FIG. 11A is a longitudinal sectional view to schematically show a state when pressing process is started in an exemplary processing flow of the second preforming process.
Figure 11B:
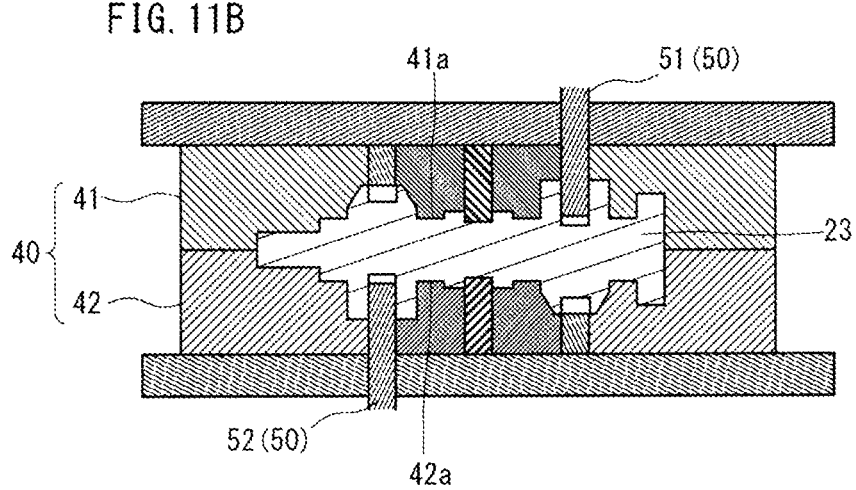
FIG. 11B is a longitudinal sectional view to schematically show a state when pressing process is ended in the exemplary processing flow of the second preforming process.
Figure 11C:
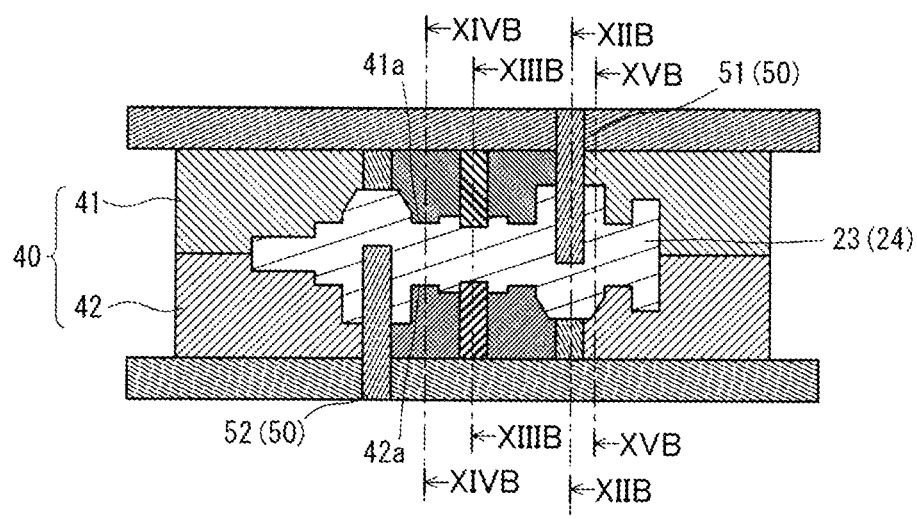
FIG. 11C is a longitudinal sectional view to schematically show a state when decentering process is ended in the exemplary processing flow of the second preforming process.
Figure 12A:
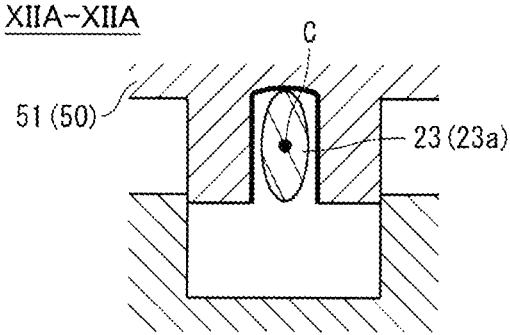
FIG. 12A is a cross-sectional view to show a region to be a pin and to be disposed at a third position when the decentering process is started in the exemplary processing flow of the second preforming process.
Figure 12B:
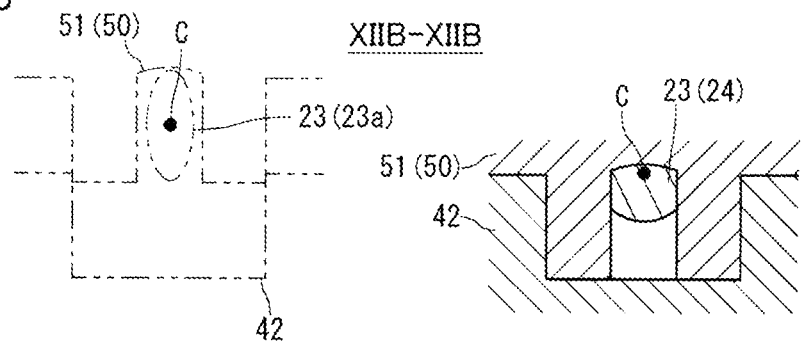
FIG. 12B is a cross-sectional view to show the region to be the pin and to be disposed at the third position when the decentering process is ended in the exemplary processing flow of the second preforming process.

FIGS. 12A and 128 are cross sectional views to show the third pin-corresponding part. Among these figures, FIG. 12A shows a state when decentering process is started, and FIG. 12B shows a state when decentering process is ended. Note that FIG. 12A is an XIIA-XIIA sectional view of FIG. 11A, and FIG. 12B is an XIIB-XIIB sectional view of FIG. 11C.

FIGS. 13A and 13B are cross sectional views to show the second pin-corresponding part. Among these figures, FIG. 13A shows a state when pressing process is started; and FIG. 138 shows a state when pressing process is ended. Note that FIG. 13A is an XIIIA-XIIIA sectional view of FIG. 11A, and FIG. 13B is an XIIIB-XIIIB sectional view of FIG. 11C.

Figure 14A:
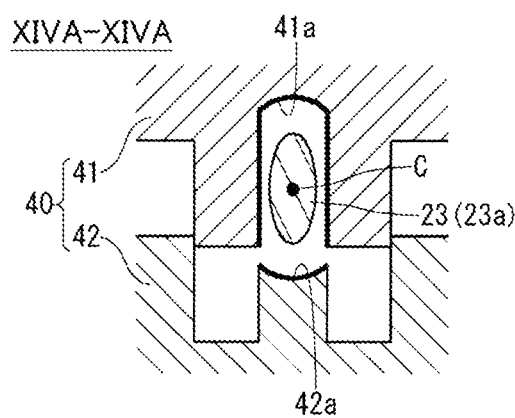
FIG. 14A is a cross-sectional view to show a region to be a journal when the pressing process is started in the exemplary processing flow of the second preforming process.
Figure 14B:
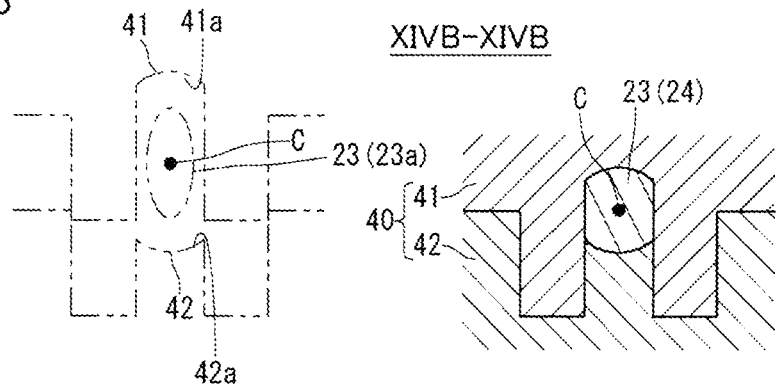
FIG. 14B is a cross-sectional view to show the region to be the journal when the pressing process is ended in the exemplary processing flow of the second preforming process.

FIGS. 14A and 14B are cross sectional views to show the journal-corresponding part. Among these figures. FIG. 14A shows a state when pressing process is started; and FIG. 14B shows a state when pressing process is ended. Note that FIG. 14A is an XIVA-XIVA sectional view of FIG. 11A, and FIG. 14B is an XIVB-XIVB sectional view of FIG. 11C.

Figure 15A:
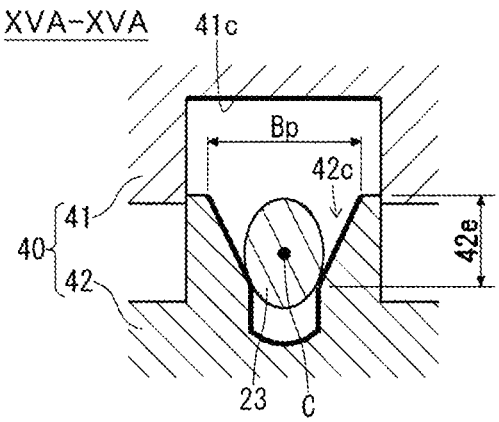
FIG. 15A is a cross-sectional view to show a region to be an arm when the pressing process is started in the exemplary processing flow of the second preforming process.
Figure 15B:
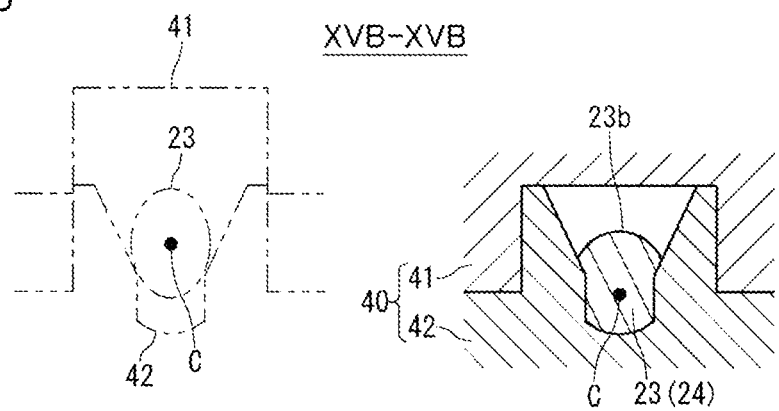
FIG. 15B is a cross-sectional view to show the region to be the arm when the pressing process is ended in the exemplary processing flow of the second preforming process.

FIGS. 15A and 15B are cross sectional views to show the arm-corresponding part. Among these figures, FIG. 15A shows a state when pressing process is started, and FIG. 15B shows a state when pressing process is ended. Note that FIG. 15A is an XVA-XVA sectional view of FIG. 11A, and FIG. 15B is an XVB-XVB sectional view of FIG. 11 C.

FIGS. 12A to 15B show the first preform 23 which is obtained in the above described first preforming process. Moreover, FIGS. 12A and 12B show the third dies 50, and FIGS. 13A to 15B show the upper and lower pair of second dies 40. The second dies 40 include the second upper die 41 and the second lower die 42. For easy understanding of the situation, FIGS. 12A to 15B each indicate an axial positions C of the journal-corresponding part with a black circle. Moreover, in FIG. 12B, the second lower die 42 and the third dies 50 when pressing process is started are indicated together by two-dot chain lines, and in FIGS. 1B, 14B and 15B, the second upper die 41 and the second lower die 42 are indicated together by two-dot chain lines. A pair of second dies 40 includes pin-processing parts 41f and 42f which are to abut against the second pin-corresponding part of the first preform 23, journal-processing parts 41a and 42a which are to abut against the journal corresponding parts, and arm-processing parts 41c and 42c which are to abut against the arm-corresponding parts.

The pin-processing part which is to abut against the second pin-corresponding part of the second dies 40 is provided at a position corresponding to the second pin-corresponding part. The pin-processing parts of the second dies 40 which are to abut against the second pin-corresponding part consist of an upper-die pin-processing part 41f provided in the second upper die 41 and a lower-die pin-processing part 42f provided in the second lower die 42 as indicated by thick lines in FIG. 13A. The lower-die pin-processing part 42f of the second lower die 42 has a concave shape, and can accommodate the first preform 23. The upper-die pin-processing part 41f of the second upper die 41 is provided in the front end surface of a convex part. Note that there is no limitation on which of the upper-die pin-processing part 41f and the lower-die pin-processing part 42f of the second dies 40 is formed into a concave shape. That is, the upper-die pin-processing part 41f of the second upper die 41 may have a concave shape that can accommodate the first preform.

The third upper die 51 of the third dies 50 has a concave shape as indicated by a thick line in FIG. 12A, and can accommodate the flat part 23a of the first preform 23. The third lower die 52 (see FIG. 9) has a configuration in which the third upper die 51 is inverted upside down.

The journal-processing part consists of, as shown by a thick line in FIG. 14A, the upper-die journal-processing part 4a provided in the second upper die 41, and the lower-die journal-processing part 42a provided in the second lower die 42. The upper-die journal-processing part 41a has a concave shape and can accommodate the flat part 23a of the first preform 23. The lower-die journal-processing part 42a is provided in a front end surface of a convex part. It is noted that there is no limitation on which of the upper-die journal-processing part 41a and the lower-die journal-processing part 42a is formed into a concave shape. That is, the lower-die journal-processing part 42a may have a concave shape that can accommodate the flat part of the first preform.

The arm-processing parts consist of, as shown by thick lines in FIG. 15A, an upper-die arm-processing part 41c provided in the second upper die 41, and a lower-die arm-processing part 42c provided in the second lower die 42. The cross sectional shape of the arm-processing part is, as shown by a thick line in FIG. 15A, such that one of the upper-die arm-processing part 41c and the lower-die arm-processing part 42c has a generally concave shape. For example, as shown in FIG. 15A, the lower-die arm-processing part 42c has a generally concave shape, and the other upper-die arm-processing part 41c has a plane shape. It is noted that which of the upper-die arm-processing part 41c or the lower-die arm-processing part 42c is formed into a concave shape can be appropriately set according to the shape of the forged crankshaft.

When the arm of the forged crankshaft includes the weight, the lower-die arm-processing part 42c has a weight-processing part 42e which is to abut against a region to be the weight (weight-corresponding part). The weight-processing part 42e is located on the opening side of the concave lower-die arm-processing part 42c. An opening width Bp of the weight-processing part 42e is widened as moving away from the bottom surface of the concave lower-die arm-processing part 42c. For example, as shown in FIG. 15A, both of the side surfaces of the weight-processing part 42e are inclined surfaces.

In the second preforming process, the thickness t1 in the axial direction of the arm-corresponding part is made to be equal to the thickness t0 of the finishing dimension (see FIGS. 3C and 3E). As a result, the lengths in the axial direction of the upper-die arm-processing part 41c and the lower-die arm-processing part 42c are equal to the thickness of the finishing dimension of the arm.

In the second preforming process, the second upper die 41 is moved upward, and with the second upper die 41 and the second lower die 42 being separated, the first preform 23 is disposed between the second upper die 41 and the second lower die 42. In such occasion, the first preform 23 is disposed in a posture in which it is rotated around the axis by 90° from a state when the first preforming process is ended such that the width direction (longitudinal diameter direction in the case of an ellipse) of the flat part corresponds to the pressing direction. As a result, the pressing direction by the second dies 40 will be a direction perpendicular to the decentering direction of the second pin-corresponding part.

The second upper die 41 is moved downward from this state. Then, as shown in FIGS. 13A and 14A, the flat part of the first preform 23 is accommodated in the pin-processing part 42f of the second lower die 42, and the upper-die journal-processing part 41a of the second upper die 41. When the arm includes the weight, as shown in FIG. 15A, the arm-corresponding part will not come into contact with the bottom surface of the lower-die arm-processing part 42c so that a major part of the arm-corresponding part is disposed in the weight-processing part 42e of the lower-die arm-processing part 42c.

When the second upper die 41 is further moved downward, a closed section is formed by the upper-die journal-processing part 41a and the lower-die journal-processing part 42a. When the second upper die 41 is further moved downward in this state to reach a bottom dead center, the flat part 23a inside the upper-die journal-processing part 41a and the lower-die journal-processing part 42a is pressed as shown in FIG. 14B. Moreover, the flat part 23a inside the upper-die pin-processing part 41f of the second upper die 41 and the lower-die pin-processing part 42f of the second lower die 42 is pressed as shown in FIG. 13B. In this way, the flat part 23a of the first preform 23 is pressed by the second dies resulting that cross sectional area is reduced in the journal-corresponding part and the second pin-corresponding part. Accordingly, excess material flows in the axial direction entering into the arm-corresponding part so that the distribution of volume progresses.

After pressing by the second dies 40 is started, the third lower die 52 and the third upper die 51 of the third dies 50 cause the first pin-corresponding part and the third pin-corresponding part to be decentered. The first pin-corresponding part and the third pin-corresponding part are both decentered along the pressing direction of the second dies 40. However, the decentering direction of the first pin-corresponding part is opposite to that of the third pin-corresponding part. Then, the decentering amounts of the first and third pin-corresponding parts become equal to or less than $(\sqrt{3})/2$ of the decentering amount of the finishing dimension. On the other hand, the second pin-corresponding part is located in a direction perpendicular to the pressing direction of the second dies 40, and will not be decentered. For that reason, the decentering amount of the second pin-corresponding part will remain to be equal to, or less than, the decentering amount of the finishing dimension.

Figure 16:
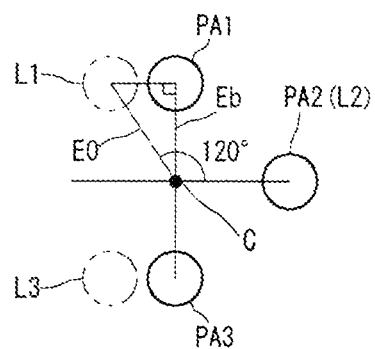
FIG. 16 is a schematic diagram to show decentering amounts of a first pin-corresponding part and a third pin-corresponding part.

FIG. 16 is a schematic diagram to show decentering amounts of the first pin-corresponding part and the third pin-corresponding part. FIG. 16 shows a forged crankshaft viewed from its axial direction. Referring to FIG. 16, phase difference is 120° between the first position L1 at which the first pin of the forged crankshaft of a 3-cylinder engine is disposed, and a second position L2 at which the second pin is disposed. However, the phase difference between the position PA1 of the first pin-corresponding part and the position PA2 of the second pin-corresponding part of the final preform, which has been obtained in the second preforming process, is 90°. Therefore, the first pin-corresponding part is further decentered with respect to the axial position C of the journal-corresponding part after the second preforming process. As a result, the phase difference between the first position L and the second position L2 is made to be 120° in the forged crankshaft that is the final product.

The decentering amount (finishing dimension) of the first pin is a distance E0 between the center of the first position L1 and the axis C of the journal. Therefore, supposing a right-angled triangle consisting of the axial position C of the journal, the center of the position of the first pin-corresponding part PA1, and the center of the first position L1, decentering amount Eb of the first pin-corresponding part PA1 in the decentering process is equal to or less than $(\sqrt{3})/2$ of the decentering amount E0 of the first pin. If the decentering amount Eb of the first pin-corresponding part is more than $(\sqrt{3})/2$ of the decentering amount E of the first pin, it is difficult to cause the first pin-corresponding part to be decentered to the first position L1 in the following finish forging process. This is because the first pin-corresponding part must be decentered to the first position L1 along a direction that is not parallel with the pressing direction (left and right direction of FIG. 16). It is noted that when the decentering amount Eb of the first pin-corresponding part is less than $(\sqrt{3})/2$ of the decentering amount E of the first pin, the following finish forging process is performed multiple times. For example, the decentering amount Eb of the first pin-corresponding part is decentered to $(\sqrt{3})/2$ of the decentering amount E of the first pin in the first finish forging process. The position of the first pin-corresponding part PA1 is decentered to the first position L1 in the second finish forging process. The same applies to the third pin-corresponding part.

After the pressing by the second dies 40 and the decentering by the third dies 50 are ended, the second upper die 41 and the third upper die 51 are moved upward, and the processed first preform 23 (final preform 24) is taken out. In the final preform 24 thus obtained, the thickness of the arm-corresponding part is equal to the thickness of the finishing dimension.

According to the second preforming process, it is possible to cause the first and third pin-corresponding parts to be decentered, respectively. Moreover, by causing the material to flow from the second pin-corresponding part and the journal-corresponding part to the arm-corresponding part, it is made possible to distribute volume in the axial direction. As a result, material yield can be improved. Moreover, when the arm includes the weight, it is possible to restrict the occurrence of under-filling in the weight. Further, as a result of that the third upper die 51 and the third lower die 52 of the third dies 50 independently move upward and downward, and that the journal-corresponding part of the first preform 23 is pressed prior to the pin-corresponding part, the first preform is not likely to be inclined during decentering of the pin-corresponding part. Since in this way, a first preform in which volume is distributed is pressed at a predetermined position of the second dies, under-filling or the like is not likely to occur in the final preform after pressing.

5. Preferable Aspects, Etc.

The amount (mm) by which the second pin-corresponding part is to be decentered by the first preforming process, that is, the decentering amount Ea (mm) of the second pin-corresponding part of the first preform 23 (the final preform 24) is preferably not less than 20% of the decentering amount of the finishing dimension (decentering amount of the pin-corresponding part of the forged crankshaft) E0 (mm). It is more preferably not less than 50% of, and most preferably 100% of, the decentering amount E0 of the finishing dimension. If the decentering amount Ea of the second pin-corresponding part is less than the decentering amount E0 of the finishing dimension, it is necessary to cause the second pin-corresponding part to be further decentered by the finish forging. For that reason, a flaw may occur. In the above described embodiment, a case in which the decentering amount Ea of the second pin-corresponding part is the same as (100% of) the decentering amount E0 of the finishing dimension is shown.

The amounts by which the first and third pin-corresponding parts are decentered by the second preforming process, that is, the decentering amounts Eb (mm) of the first and third pin-corresponding parts of the final preform 24 are preferably equal to or less than $(\sqrt{3})/2$ of the decentering amount E0 (mm) of the finishing dimension. The above described embodiment shows a case in which the decentering amounts Eb of the first and third pin-corresponding parts are equal to $(\sqrt{3})/2$ of the decentering amount E0 of the finishing dimension. However, in view of ensuring the fillability of material into the engraved part for pin, the decentering amounts Eb of the first and third pin-corresponding parts of the final preform 24 are preferably not less than $(1.0-Dp/2/((\sqrt{3})/2 \times E0))$ in its ratio $(Eb/((\sqrt{3})/2 \times E0))$ with respect to the decentering amount E0 of the finishing dimension. Where, Dp means a diameter of the pin of the finishing dimension (diameter of the pin of the forged crankshaft). From the same viewpoint, the cross sectional area Spb (mm$^2$) of the first and third pin-corresponding parts of the final preform 24 is preferably not less than 0.7 and not more than 1.5 in its ratio ((Spb)/Sp0) with respect to the cross sectional area Sp0 (mm$^2$) of the pin of forged crankshaft, and more preferably not less than 0.75 and not more than 1.1.

Moreover, it goes without saying that the present embodiment will not be limited to the above described embodiment, and can be modified in various ways within a range not departing from the spirit of the present invention.

INDUSTRIAL APPLICABILITY

The present invention can be effectively used for producing a forged crankshaft to be mounted on a 3-cylinder reciprocating engine.

REFERENCE SIGNS LIST

11: Forged crankshaft
22: Billet
23: First preform
23a: Flat part
24: Final preform
25: Finish forged preform
30: First die
31: First upper die
31a: Upper-die journal-processing part of first die
31b: Upper-die pin-processing part of first die
32: First lower die
32a: Lower-die journal-processing part of first die
32b: Lower-die pin-processing part of first die
40: Second die
41: Second upper die
41a: Upper-die journal-processing part of second die
41c: Upper-die arm-processing part of second die
41f: Upper-die pin-processing part of second die
42: Second lower die
42a: Lower-die journal-processing part of second die
42c: Lower-die arm-processing part of second die
42e: Weight-processing part
42f: Lower-die pin-processing part of second die
42h: Pin-processing part of second lower die
50: Third die
51: Third upper die
52: Third lower die
A, A1 to A6: Crank arm
J, J1 to J4: Journal
P, P1 to P3: Pin
W, W1 to W4: Counterweight
PA, PA1 to PA3: Pin-corresponding part
B: Flash

The invention claimed is:

1. A production method of a forged crankshaft, the forged crankshaft including: four journals each defining a rotation center; three pins each decentered with respect to the journals, the pins being respectively disposed at a first position, a second position, and a third position at a phase angle of 120°; and a plurality of crank arms that connect the journals with the pins, respectively, the production method comprising:
 a first preforming process for obtaining a first preform from a billet;
 a second preforming process for obtaining a final preform from the first preform; and
 a finish forging process for forming the final preform into a finishing dimension of the forged crankshaft by at least a single die forging step, wherein
 in the first preforming process, by using a pair of first dies, regions to be the pins and regions to be the journals of the billet are pressed from a direction perpendicular to an axial direction of the billet, so that while a cross sectional area of each of the regions is decreased thereby forming a plurality of flat parts, a region to be a second pin and to be disposed at the second position of the flat parts is decentered such that the decentering amount of the region to be the second pin becomes equal to or less than the decentering amount of the finishing dimension; wherein the second preforming process includes: a process of pressing regions to be the plurality of journals in a pressing direction corresponding to a width direction of the flat part, by using a pair of second dies; and a process of, after starting pressing by the second dies, decentering a region to be disposed at the first position and to be a first pin, and a region to be disposed at the third position and to be a third pin from each other in opposite directions in a decentering direction corresponding to the width direction of the flat part by using third dies, such that decentering amounts of the regions to be the first pin and the third pin are equal to, or less than $(\sqrt{3})/2$ of the decentering amount of the finishing dimension; and wherein in the final preform, a thickness of each region to be the plurality of crank arms is equal to a thickness of the finishing dimension.

2. The production method of a forged crankshaft according to claim 1, wherein in the second preforming process, after pressing by the pair of second dies is completed, decentering of the region to be the first pin and the region to be the third pin by the third dies is started.

* * * * *